US010504211B2

(12) United States Patent
Schroers et al.

(10) Patent No.: US 10,504,211 B2
(45) Date of Patent: Dec. 10, 2019

(54) SAMPLE-BASED VIDEO DENOISING

(71) Applicant: Disney Enterprises, Inc., Burbank, CA (US)

(72) Inventors: Christopher Schroers, Saarbrücken (DE); Henning Zimmer, Zurich (CH); Alexander Sorkine Hornung, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 163 days.

(21) Appl. No.: 15/630,881

(22) Filed: Jun. 22, 2017

(65) Prior Publication Data

US 2018/0260936 A1    Sep. 13, 2018

Related U.S. Application Data

(60) Provisional application No. 62/470,126, filed on Mar. 10, 2017.

(51) Int. Cl.
*G06T 5/00* (2006.01)
*H04N 5/213* (2006.01)
(Continued)

(52) U.S. Cl.
CPC ............ *G06T 5/002* (2013.01); *G06T 1/20* (2013.01); *G06T 5/003* (2013.01); *G06T 5/20* (2013.01);
(Continued)

(58) Field of Classification Search
CPC .. G06T 5/002; G06T 5/50; G06T 5/20; G06T 2207/20182; G06T 2207/20172;
(Continued)

(56) References Cited

U.S. PATENT DOCUMENTS

2006/0257042 A1    11/2006 Ofek
2010/0165206 A1*    7/2010 Nestares ............... G06T 5/50
                                                                 348/607
(Continued)

OTHER PUBLICATIONS

Klose, Felix, et al., "Sampling Based Scene Space Video Processing." Acm Siggraph, 2015. Los Angeles, California. pp. 1-11.
(Continued)

*Primary Examiner* — Wesley J Tucker
(74) *Attorney, Agent, or Firm* — Farjami & Farjami LLP

(57) ABSTRACT

According to one implementation, a video processing system includes a computing platform having a hardware processor and a system memory storing a sample-based video denoising software code. The hardware processor executes the sample-based video denoising software code to receive a video sequence, and select a reference frame of the video sequence to denoise. For each pixel of the reference frame, the hardware processor executes the sample-based video denoising software code to map the pixel to a sample pixel in each of other frames of the video sequence, identify a first confidence value corresponding to each of the sample pixels based on the mapping, identify a second confidence value corresponding to each of the sample pixels based on the frame that includes the sample pixel, and denoise the pixel based on a weighted combination of the sample pixels determined using the first confidence values and the second confidence values.

20 Claims, 4 Drawing Sheets

(51) Int. Cl.
*G06T 5/20* (2006.01)
*G06T 1/20* (2006.01)
*H04N 5/21* (2006.01)

(52) U.S. Cl.
CPC ............... *H04N 5/21* (2013.01); *H04N 5/213* (2013.01); *G06T 2207/10016* (2013.01); *G06T 2207/10024* (2013.01); *G06T 2207/20076* (2013.01); *G06T 2207/20172* (2013.01); *G06T 2207/20182* (2013.01)

(58) Field of Classification Search
CPC . G06T 1/20; G06T 5/003; G06T 2207/20076; G06T 2207/10024; G06T 2207/10016; H04N 5/21; H04N 5/213
USPC .................................................. 382/254, 275
See application file for complete search history.

(56) References Cited

U.S. PATENT DOCUMENTS

| | | | |
|---|---|---|---|
| 2011/0211758 A1* | 9/2011 | Joshi | ........................ G06T 5/003 382/167 |
| 2011/0311115 A1 | 12/2011 | Li | |
| 2012/0121202 A1 | 5/2012 | Wang et al. | |
| 2015/0262336 A1* | 9/2015 | Jin | ......................... G06T 3/4053 382/275 |
| 2016/0006978 A1* | 1/2016 | Satoh | ................. H04N 5/23267 386/269 |
| 2016/0373717 A1 | 12/2016 | Wang | |
| 2017/0064204 A1 | 3/2017 | Sapiro et al. | |
| 2018/0122052 A1 | 5/2018 | Lebrun et al. | |

OTHER PUBLICATIONS

Cho, Sunghyun, et al. "Video Deblurring for Hand-Held Cameras Using Patch-Based Synthesis." ACM Transactions on Graphics (TOG) 31.4 (2012): 64.

Delbracio, Mauricio, et al. "Hand-Held Video Deblurring Via Efficient Fourier Aggregation." arXiv preprint arXiv: 1509.05251 (2015).

Kim Tae Hyun, et al. "Generalized Video Deblurring for Dynamic Scenes." Computer Vision and Pattern Recognition (CVPR), 2015 IEEE Conference. IEEE, 2015.

Xiao, Jiangjian, et al. "Bilateral Filtering-Based Optical Flow Estimation with Occlusion Detection." European Conference on Computer Vision. Springer, Berlin, Heidelberg, 2006.

* cited by examiner

SAMPLE-BASED VIDEO DENOISING

RELATED APPLICATIONS

The present application claims the benefit of and priority to a Provisional Patent Application Ser. No. 62/470,126, filed Mar. 10, 2017, and titled "Sample-based Video Denoising and Sample-based Video Sharpening," which is hereby incorporated fully by reference into the present application.

BACKGROUND

Due to the popularity of video as an entertainment medium, ever more video content, including high definition (HD) and Ultra HD video content is being produced and made available to consumers. One fundamental challenge encountered in video processing is video denoising, which is the removal of noise from video images that is inevitably generated as video is produced. The object of denoising is to remove such noise without destroying small scale features included in the video images.

One technique for denoising video is performed in three-dimensional (3D) "scene space," in which video pixels are processed according to their 3D positions. Scene space based denoising relies on depth reconstruction, which limits that approach to static scenes with significant camera motion. However, in practice, most video sequences feature many dynamic moving objects, and often little or no camera motion, making depth reconstruction impossible.

SUMMARY

There are provided sample-based video denoising systems and methods, substantially as shown in and/or described in connection with at least one of the figures, and as set forth more completely in the claims.

DETAILED DESCRIPTION

Figure 1:
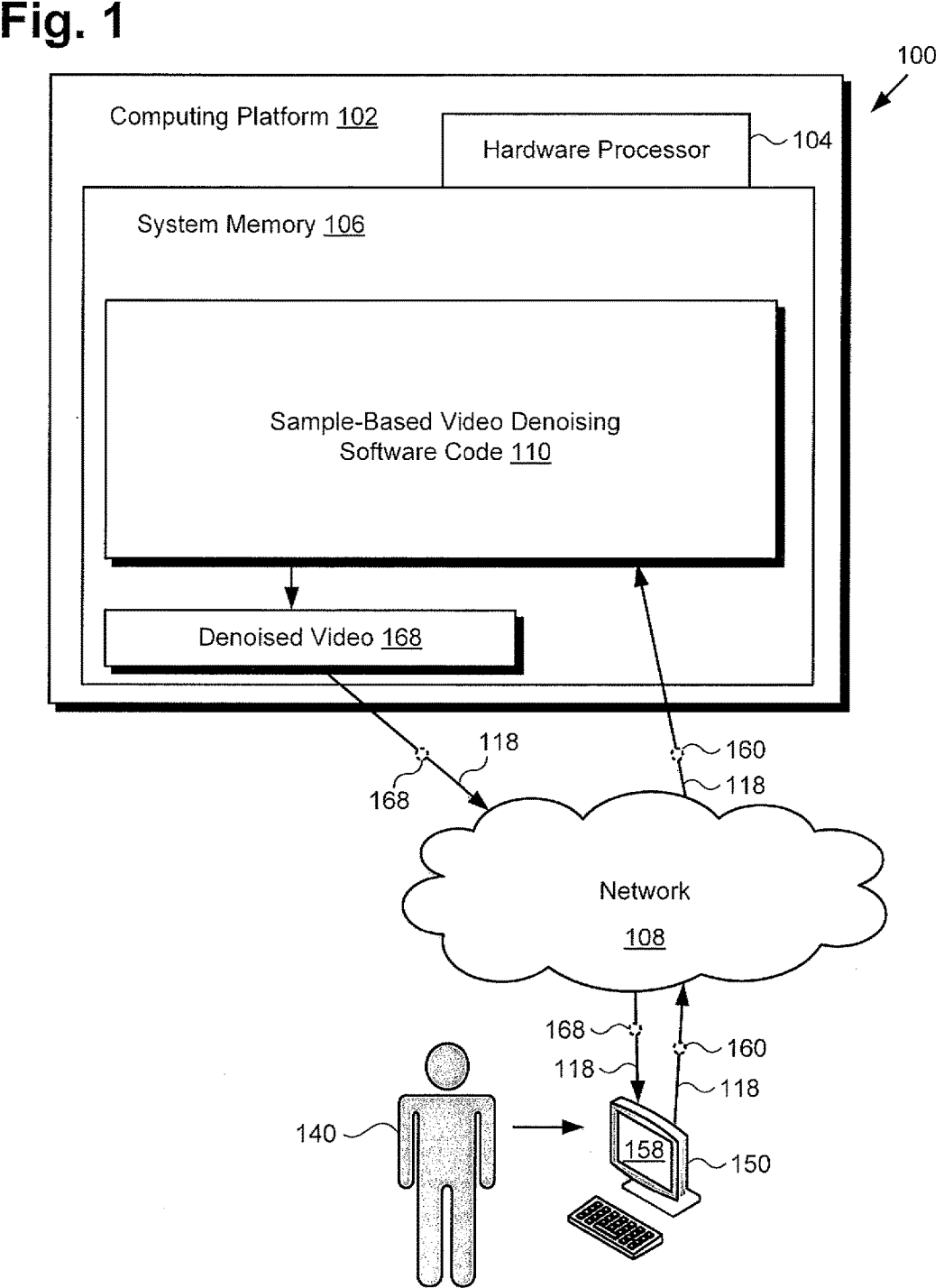
FIG. 1 shows a diagram of an exemplary video processing system for performing sample-based video denoising, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, due to the popularity of video as an entertainment medium, ever more video content, including high definition (HD) and Ultra HD video content is being produced and made available to consumers. One fundamental challenge encountered in video processing is video denoising, which is the removal of noise from video images that is inevitably generated as video is produced.

As further stated above, one technique for denoising video is performed in three-dimensional (3D) "scene space," in which video pixels are processed according to their 3D positions. Scene space based denoising relies on depth reconstruction, which limits that approach to static scenes with significant camera motion. However, in practice, most video sequences feature many dynamic moving objects, and often little or no camera motion, making depth reconstruction impossible.

The present application discloses a sample-based video denoising solution that overcomes the drawbacks and deficiencies in the conventional art. The present sample-based video denoising solution is performed in two-dimensional (2D) "image-space," rather than 3D scene space, to map pixels in a reference frame of a video sequence to respective sample pixels in other frames of the video sequence. Confidence values corresponding respectively to the sample pixels and to the frames containing those sample pixels are determined and used to denoise the pixels in the reference frame. By performing denoising in 2D image-space, the present solution enables high quality, temporally coherent, denoising of arbitrary video sequences including dynamic content and little or no camera motion, while advantageously preserving small scale features included in the video.

FIG. 1 shows a diagram of an exemplary video processing system for performing sample-based video denoising, according to one implementation. As shown in FIG. 1, video processing system 100 includes computing platform 102 having hardware processor 104, and system memory 106 implemented as a non-transitory storage device. According to the present exemplary implementation, system memory 106 stores sample-based video denoising software code 110.

As further shown in FIG. 1, video processing system 100 is implemented within a use environment including communication network 108, user device 150 including display 158, and user 140 utilizing user device 150. Also shown in FIG. 1 are network communication links 118 interactively connecting user device 150 and video processing system 100 via communication network 108, video sequence 160, and denoised video 168 produced using sample-based video denoising software code 110.

It is noted that although FIG. 1 depicts sample-based video denoising software code 110 as being stored in its entirety in memory 106, that representation is merely provided as an aid to conceptual clarity. More generally, video processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within video processing system 100. Thus, it is to be understood that various portions of sample-based video denoising software code 110, such as one or more of the features described below by reference to FIG. 4, may be stored and/or executed using the distributed memory and/or processor resources of video processing system 100.

According to the implementation shown by FIG. 1, user 140 may utilize user device 150 to interact with video processing system 100 over communication network 108. In one such implementation, video processing system 100 may correspond to one or more web servers, accessible over a packet-switched network such as the Internet, for example. Alternatively, video processing system 100 may correspond to one or more computer servers supporting a local area network (LAN), or included in another type of limited distribution network.

Although user device 150 is shown as a personal computer (PC) in FIG. 1, that representation is also provided merely as an example. In other implementations, user device 150 may be any other suitable mobile or stationary computing device or system. For example, in other implementations, user device 150 may take the form of a laptop computer, tablet computer, or smartphone, for example. User 140 may utilize user device 150 to interact with video processing system 100 to use sample-based video denoising software code 110, executed by hardware processor 104, to produce denoised video 168.

It is noted that, in various implementations, denoised video 168, when produced using sample-based video denoising software code 110, may be stored in system memory 106 and/or may be copied to non-volatile storage (not shown in FIG. 1). Alternatively, or in addition, as shown in FIG. 1, in some implementations, denoised video 168 may be sent to user device 150 including display 158, for example by being transferred via network communication links 118 of communication network 108. It is further noted that display 158 may take the form of a liquid crystal display (LCD), a light-emitting diode (LED) display, an organic light-emitting diode (OLED) display, or another suitable display screen that performs a physical transformation of signals to light.

Figure 2:
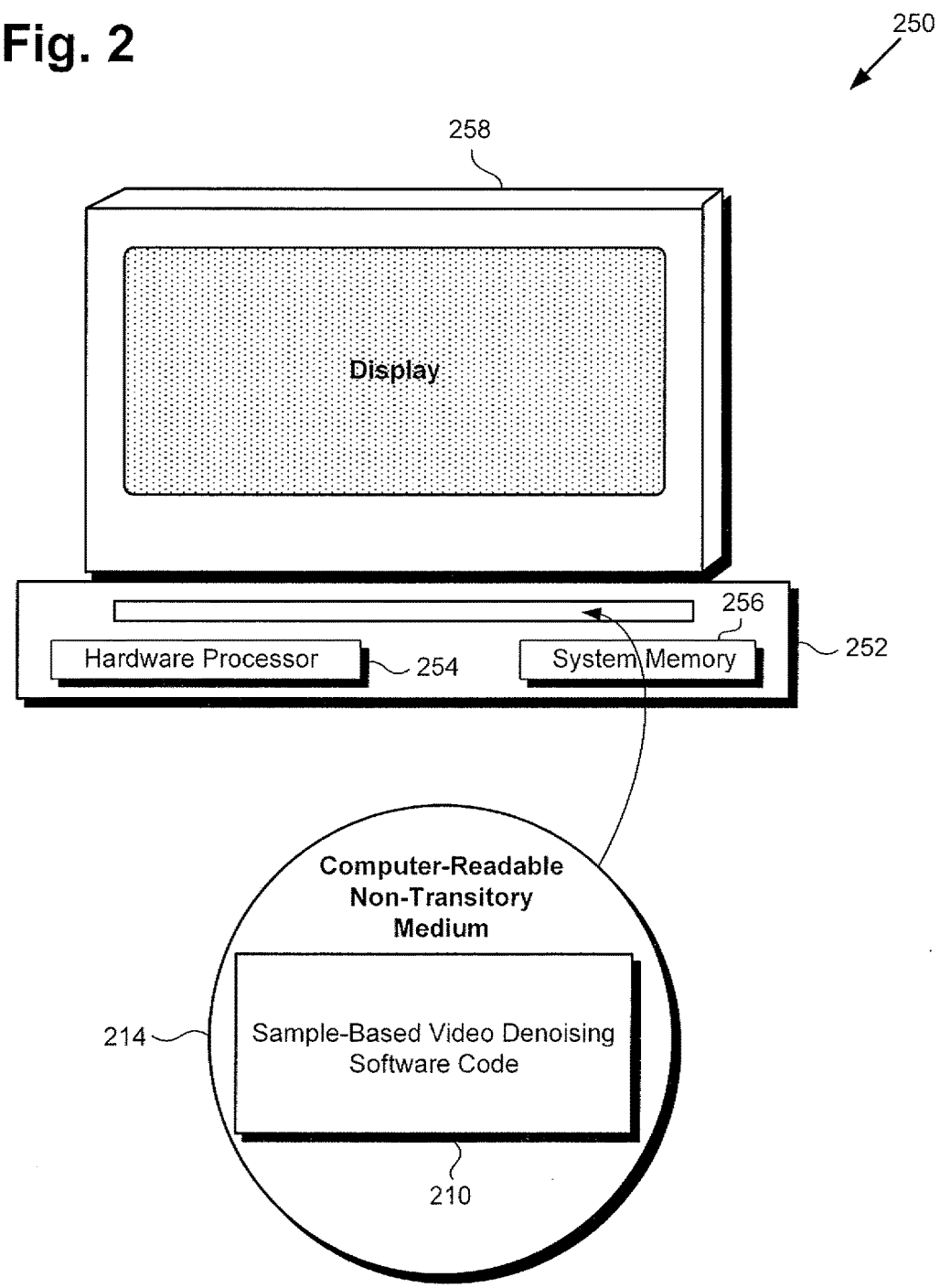
FIG. 2 shows an exemplary system and a computer-readable non-transitory medium including instructions for performing sample-based video denoising, according to one implementation.

FIG. 2 shows exemplary system 250 and computer-readable non-transitory medium 214 including instructions for performing sample-based video denoising, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to video processing system 100 including computing platform 102 having hardware processor 104 and system memory 106, in FIG. 1. Consequently, system 250 may share any of the characteristics attributed to corresponding video processing system 100 by the present disclosure.

Also shown in FIG. 2 is computer-readable non-transitory medium 214 having sample-based video denoising software code 210 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 214 provides sample-based video denoising software code 210 for execution by hardware processor 254 of computing platform 252. Sample-based video denoising software code 210 corresponds in general to sample-based video denoising software code 110, in FIG. 1, and is capable of performing all of the operations attributed to that corresponding feature by the present disclosure.

Figure 3:
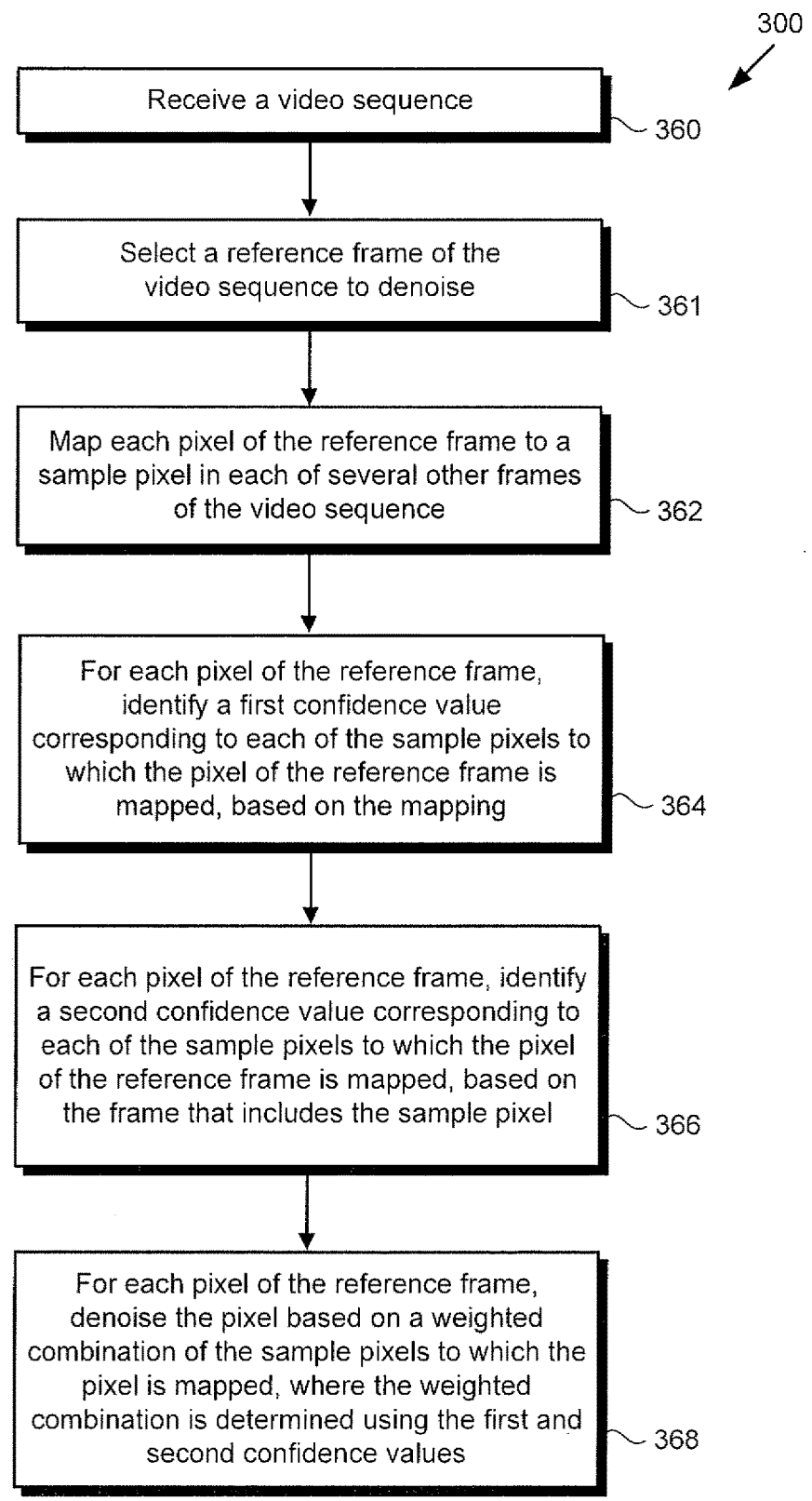
FIG. 3 shows a flowchart presenting an exemplary method for performing sample-based video denoising, according to one implementation.

The functionality of sample-based video denoising software code 110/210 will be further described by reference to FIG. 3 in combination with FIGS. 1, 2, and 4. FIG. 3 shows flowchart 300 presenting an exemplary method for use by a system, such as video processing system 100, in FIG. 1, or system 250, in FIG. 2, to perform sample-based video denoising. With respect to the method outlined in FIG. 3, it is noted that certain details and features have been left out of flowchart 300 in order not to obscure the discussion of the inventive features in the present application.

Figure 4:
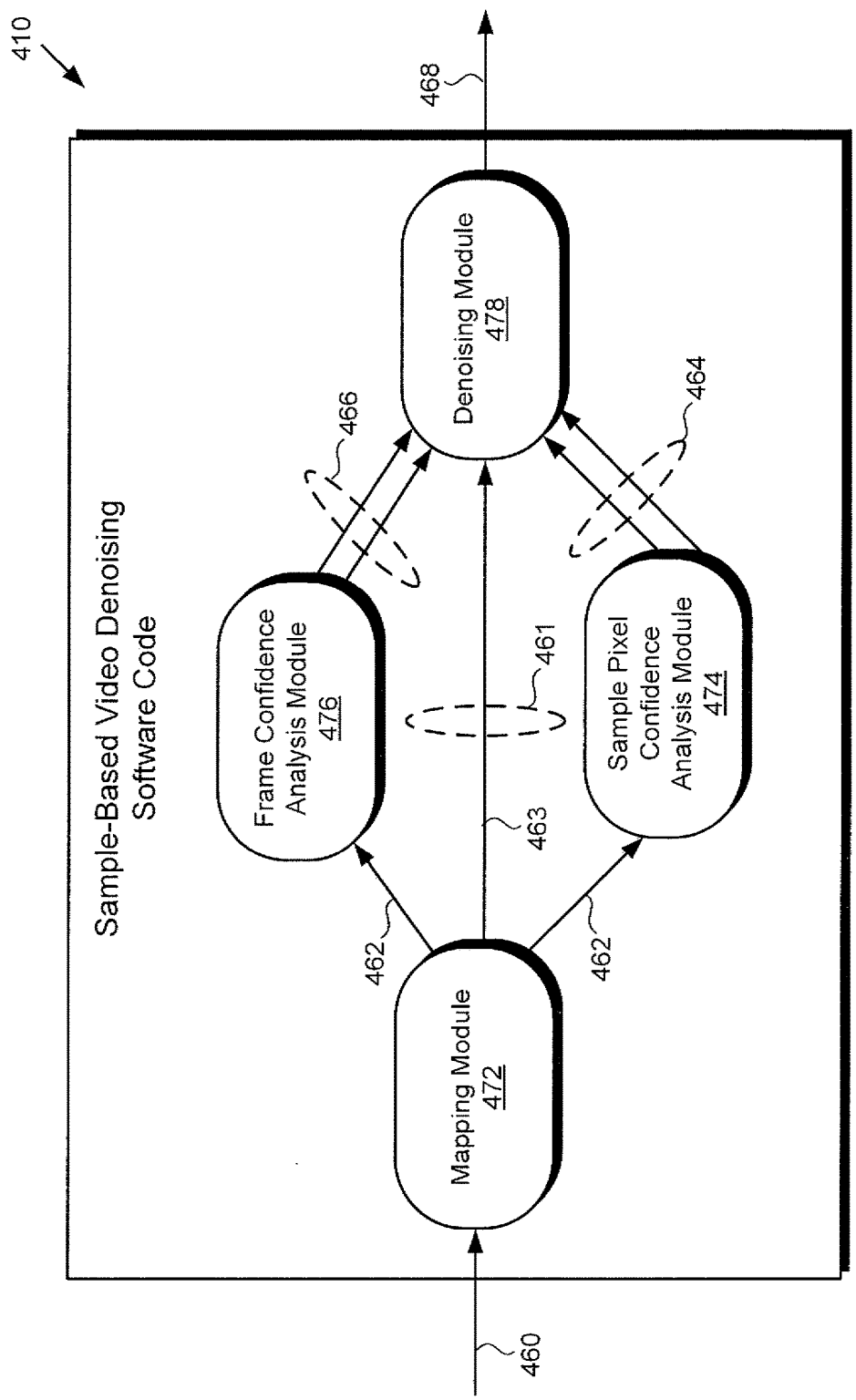
FIG. 4 shows an exemplary diagram of a sample-based video denoising software code suitable for execution by a hardware processor of the systems shown by FIGS. 1 and 2, according to one implementation.

FIG. 4 shows exemplary sample-based video denoising software code 410 suitable for execution by hardware processor 104/254 of the respective systems shown by FIGS. 1 and 2, according to one implementation. As shown in FIG. 4, sample-based video denoising software code 410 may include mapping module 472, sample pixel confidence analysis module 474, frame confidence analysis module 476, and denoising module 478. Also shown in FIG. 4 are video sequence 460, reference frame 461 including pixels represented by exemplary pixel 463, mapping 462, confidence values 464, confidence values 466, and denoised video 468.

Video sequence 460 and denoised video 468 correspond respectively in general to video sequence 160 and denoised video 168, in FIG. 1, and may share any of the characteristics attributed to those corresponding features by the present disclosure. In other words, like video sequence 460, video sequence 160 includes multiple frames that may serve as reference frame 461, each frame including multiple pixels corresponding to pixel 463.

Moreover, sample-based video denoising software code 410 corresponds in general to sample-based video denoising software code 110/210, in FIGS. 1 and 2, and those corresponding features may share the characteristics attributed to any corresponding feature by the present disclosure. That is to say, like sample-based video denoising software code 410, sample-based video denoising software code 110/210 may include modules corresponding to mapping module 472, sample pixel confidence analysis module 474, frame confidence analysis module 476, and denoising module 478.

Referring now to FIG. 3 in combination with FIGS. 1, 2, and 4, flowchart 300 begins with receiving video sequence 160/460 (action 360). By way of example, user 140 may utilize user device 150 to interact with video processing system 100, or may interact directly with system 250, in order to produce denoised video 168/468. As shown by FIG. 1, in one implementation, user 140 may do so by transmitting video sequence 160/460 from user device 150 to video processing system 100 via communication network 108 and network communication links 118. Alternatively, video sequence 160/460 may be received from a third party source of video content, or may be stored in system memory 106/256. Video sequence 160/460 may be received by sample-based video denoising software code 110/210/410, executed by hardware processor 104/254.

Video sequence 160/460 includes multiple video frames, identifiable as corresponding to one or more shots. By way of definition, a "shot" refers to a sequence of frames within video sequence 160/460 that are captured from a unique camera perspective without significant camera movement, cuts, and/or other cinematic transitions. Thus, video sequence 160/460 may include a single shot having multiple frames, or may include multiple shots, with each shot having multiple frames. Furthermore, it is noted that a single frame of video sequence 160/460 may include multiple color images, some of which may be images of dynamic moving objects.

Flowchart 300 continues with selecting reference frame 461 of video sequence 160/460 to denoise (action 361). The selection of reference frame 461 may be performed by sample-based video denoising software code 110/210/410, executed by hardware processor 104/254.

In some implementations, it may be advantageous or desirable to denoise all, or substantially all of the frames of video sequence 160/460. In some of those implementations, for example, reference frame 461 may be selected arbitrarily from among the frames of video sequence 160/460. Moreover, subsequent, to denoising of reference frame 461, all, or substantially all other frames of video sequence 160/460 may be selected in turn to serve as reference frame 461 and undergo denoising.

Flowchart 300 continues with, for each pixel 463 of reference frame 461, mapping 462 pixel 463 to a sample pixel in each of some or all of the other frames of video sequence 160/460 (action 362). The mapping 462 of pixel 463 to a sample pixel in each of some or all of the other frames of video sequence 160/460 may be performed by sample-based video denoising software code 110/210/410, executed by hardware processor 104/254, and using mapping module 472.

Mapping 462 may be performed using image space correspondences, for example, determined by means of optical flow. As a specific example, and expressing video sequence 160/460 as $f(x, t)$ with spatial coordinates $x=(x, y)^T$ and time t, it is noted that color images, such as the images in reference frame 461, commonly use three channels such that typically, $f: R^3 \rightarrow R^3$. It is further noted that, insofar as the variable t may describes temporal progression through the frames of video sequence 160/460, t may be used to represent frame progression and/or progression in time. Thus, the sequence $t_{-n}, \ldots t_n$ can refer concurrently to progression from an earlier time $t_{-n}$ to a later time $t_n$, or from an earlier frame $t_{-n}$ to a later frame $t_n$.

Characterizing reference frame 461 as $t_0$, an optical flow field $E(u)$ from reference frame 461 to another, later, frame t can be expressed using Equation 1:

$$E(u) = \int_\Omega \Psi(\|f(x+u(x),t)-f(x,t_0)\|^2) + \Psi(\|\mathcal{J} u\|^2) dx;$$

with a robust penalization function: $\Psi(s^2) = \sqrt{s^2 + \varepsilon^2}$ and $\varepsilon = 0.001$, Where $\mathcal{J}$ denotes the Jacobian, and denotes the Euclidean norm, as known in the art. It is emphasized that, although Equation 1 is used as an exemplary expression for optical flow, other techniques for determining correspondences between pixel 463 of reference frame 461 and sample pixels of other frames may be utilized.

The flow $u(x) = (u_1(x), u_2(x))^T$ is obtained by solving Equation 1 for $u(x)$ and may be used to relate a location x in reference frame 461 ($t_0$) to the location $x+u(x, t)$ in frame t, i.e., a potential corresponding sample pixel in another frame. Thus, according to the exemplary technique described above, pixel 463 of reference frame 461 is mapped to a sample pixel in other frames based on an optical flow field from reference frame 461 to the other frames. Moreover, pixel 463 has a first location x in reference frame 461, while the sample pixels have respective second locations $x+u(x, t)$ in the other frames.

Flowchart 300 continues with, for each pixel 463 of reference frame 461, identifying a first confidence value 464 corresponding to each of the sample pixels to which pixel 463 is mapped, based on mapping 462 (action 364). Identification of first confidence value 464 may be performed by sample-based video denoising software code 110/210/410, executed by hardware processor 104/254, and using sample pixel confidence analysis module 474.

The mapping 462 described above can be a highly error prone process, such that not all sample pixels to which pixel 463 is mapped are actually useful for denoising pixel 463. In fact, if correspondences are determined from reference frame 461 to all other frames in video sequence 160/460, most of the determined correspondences will not be useful for denoising pixel 463. As a result, it is advantageous to identify confidence values corresponding to each of the sample pixels in order to identify relevant sample pixels for use in denoising reference pixel 463.

For notational convenience, and to explicitly state which frame t the flow field u targets, a correspondence function $g(x, t)$ is introduced as Equation 2:

$$g(x,t) = (x+u_1(x,y), y+u_2(x,y), t)^T$$

such that a sequence of corresponding points in frames $t_{-n}, \ldots t_n$ that match to the location x in reference frame 461 ($t_0$) can be addressed directly in video sequence 160/460 (f) by selecting the locations: $g(x, t_{-n}), \ldots, g(x, t_n)$.

In view of the foregoing, confidence value 464 corresponding to each of the sample pixels to which pixel 463 is mapped, i.e., $w_c(x; t)$ can be expressed using Equation 3:

$$w_c(x, t) = \exp\left(\frac{-\|((G_\sigma * f)(x, t_0) - (G_\sigma * (f \circ g))(x, t))\|^2}{\sigma_c^2}\right)$$

where * denotes a spatial convolution, $G_\sigma$ is a Gaussian with standard deviation $\sigma$, and $\sigma_c$ is the standard deviation of the roughly Gaussian function $w_c(x, t)$.

According to Equation 3, above, confidence value 464 corresponding to each of the sample pixels is based on a color match between pixel 463 of reference frame 461 and the sample pixel. Furthermore, confidence value 464 is proportional to the color match between pixel 463 of reference frame 461 and the sample pixel. It is noted that, as defined in the present application, when a feature "A" is described as being "proportional" to another feature "B", A increases as B increases and A decreases as B decreases. Conversely, when a feature "C" is described as being "inversely proportional" to another feature "D", C increases as D decreases and C decreases as D increases.

Flowchart 300 continues with, for each pixel 463 of reference frame 461, identifying a second confidence value 466 corresponding to each of the sample pixels to which pixel 463 is mapped, based on the frame that includes the sample pixel (action 366). In addition to confidence value 464, identified in action 364, and which increases the weight attributed to a sample pixel based on the color match between the sample pixel and reference pixel 463, it may be desirable to reduce the weight attributed to sample pixels contained in frames that are farther away in time from reference frame 461. To that end, a second confidence value 466 [$w_t(t)$] may be expressed using equation 4:

$$w_t(t) = \exp\left(\frac{-(t_0 - t)^2}{\sigma_t^2}\right)$$

where $\sigma_t$ is the standard deviation of the roughly Gaussian function $w_t(t)$.

Identification of second confidence value 466 may be performed by sample-based video denoising software code 110/210/410, executed by hardware processor 104/254, and using frame confidence analysis module 476. It is reiterated that confidence value 466 corresponding to each of the sample pixels is based on a temporal separation of the frame including the sample pixel from reference frame 461, may be inversely proportional to that temporal separation.

Flowchart 300 can conclude with, for each pixel 463 of reference frame 461, denoising pixel 463 based on a weighted combination of the sample pixels determined using confidence values 464 and confidence values 466 (action 368). Denoising of pixel 463 may be performed by sample-based video denoising software code 110/210/410, executed by hardware processor 104/254, and using denoising module 478.

For example, the denoised output color value for pixel 463 at location x in reference frame 461 ($t_0$) can be expressed as a convex combination by Equation 5:

$$\hat{f}(x, t_0) = \left(\sum_{t=t_0-n}^{t_0+n} w_c(x, t) \cdot w_t(t) \cdot (f \circ g)(x, t)\right) \cdot \left(\sum_{t=t_0-n}^{t_0+n} w_c(x, t) \cdot w_t(t)\right)^{-1}$$

Action 368 is performed for each pixel of reference frame 461, thereby denoising reference frame 461. Moreover, the method outlined in flowchart 360 can be iteratively applied to other frames of video sequence 160/460, such as all or substantially all other frames of video sequence 160/460, to produce denoised video 168/468.

Thus, the present application discloses a sample-based video denoising solution that overcomes the drawbacks and deficiencies in the conventional art by performing denoising in 2D image-space to map pixels in a reference frame of a video sequence to respective sample pixels in other frames of the video sequence. Confidence values corresponding respectively to the sample pixels and to the frames containing those sample pixels are determined, and used to denoise the pixels in the reference frame. By performing denoising in 2D image-space, rather than in 3D scene space, the present solution enables high quality, temporally coherent, denoising of arbitrary video sequences including dynamic content and little or no camera motion, while advantageously preserving small scale features included in the video.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
    a computing platform including a hardware processor and a system memory;
    a sample-based video denoising software code stored in the system memory;
    the hardware processor configured to execute the sample-based video denoising software code to:
        receive a video sequence;
        select a reference frame of the video sequence to denoise;
        for each pixel of the reference frame:
            map the pixel to a sample pixel in each of a plurality of other frames of the video sequence, the plurality of other frames including earlier and later frames of the reference frame of the video sequence;
            identify a first confidence value corresponding to each of the sample pixels, based on the mapping;
            identify a second confidence value corresponding to each of the sample pixels, based on a frame of the plurality of other frames that includes the sample pixel; and
            denoise the pixel based on a weighted combination of the sample pixels determined using the first confidence values and the second confidence values.

2. The video processing system of claim 1, wherein the pixel has a first location in the reference frame, and wherein the sample pixels have respective second locations in the plurality of other frames.

3. The video processing system of claim 1, wherein the pixel of the reference frame is mapped to the sample pixel in each of the plurality of other frames based on an optical flow field from the reference frame to each of the plurality of other frames.

4. The video processing system of claim 1, wherein the first confidence value corresponding to each of the sample pixels is based on a color match between the pixel of the reference frame and the sample pixel.

5. The video processing system of claim 1, wherein the first confidence value is proportional to a color match between the pixel of the reference frame and the sample pixel.

6. The video processing system of claim 1, wherein the second confidence value corresponding to each of the sample pixels is based on a temporal separation of the frame including the sample pixel from the reference frame.

7. The video processing system of claim 1, wherein the second confidence value corresponding to each of the sample pixels is inversely proportional to a temporal separation of the frame including the sample pixel from the reference frame.

8. A method for use by a video processing system including a computing platform having a hardware processor and a system memory storing a sample-based video denoising software code, the method comprising:
    receiving, using the hardware processor, a video sequence;
    selecting, using the hardware processor, a reference frame of the video sequence to denoise;
    for each pixel of the reference frame:
        mapping, using the hardware processor, the pixel to a sample pixel in each of a plurality of other frames of the video sequence, the plurality of other frames including earlier and later frames of the reference frame of the video sequence;

identifying, using the hardware processor, a first confidence value corresponding to each of the sample pixels, based on the mapping;

identifying, using the hardware processor, a second confidence value corresponding to each of the sample pixels, based on a frame of the plurality of other frames that includes the sample pixel; and denoising, using the hardware processor, the pixel based on a weighted combination of the sample pixels determined using the first confidence values and the second confidence values.

9. The method of claim 8, wherein the pixel has a first location in the reference frame, and wherein the sample pixels have respective second locations in the plurality of other frames.

10. The method of claim 8, wherein the pixel of the reference frame is mapped to the sample pixel in each of the plurality of other frames based on an optical flow field from the reference frame to each of the plurality of other frames.

11. The method of claim 8, wherein the first confidence value corresponding to each of the sample pixels is based on a color match between the pixel of the reference frame and the sample pixel.

12. The method of claim 8, wherein the first confidence value is proportional to a color match between the pixel of the reference frame and the sample pixel.

13. The method of claim 8, wherein the second confidence value corresponding to each of the sample pixels is based on a temporal separation of the frame including the sample pixel from the reference frame.

14. The method of claim 8, wherein the second confidence value corresponding to each of the sample pixels is inversely proportional to a temporal separation of the frame including the sample pixel from the reference frame.

15. A computer-readable non-transitory medium having stored thereon instructions, which when executed by a hardware processor, instantiate a method comprising:

receiving a video sequence;

selecting a reference frame of the video sequence to denoise;

for each pixel of the reference frame:
mapping the pixel to a sample pixel in each of a plurality of other frames of the video sequence, the plurality of other frames including earlier and later frames of the reference frame of the video sequence;

identifying a first confidence value corresponding to each of the sample pixels, based on the mapping;

identifying a second confidence value corresponding to each of the sample pixels, based on a frame of the plurality of other frames that includes the sample pixel; and denoising the pixel based on a weighted combination of the sample pixels determined using the first confidence values and the second confidence values.

16. The computer-readable non-transitory medium of claim 15, wherein the pixel has a first location in the reference frame, and wherein the sample pixels have respective second locations in the plurality of other frames.

17. The computer-readable non-transitory medium of claim 15, wherein the pixel of the reference frame is mapped to the sample pixel in each of the plurality of other frames based on an optical flow field from the reference frame to each of the plurality of other frames.

18. The computer-readable non-transitory medium of claim 15, wherein the first confidence value corresponding to each of the sample pixels is based on a color match between the pixel of the reference frame and the sample pixel.

19. The computer-readable non-transitory medium of claim 15, wherein the second confidence value corresponding to each of the sample pixels is based on a temporal separation of the frame including the sample pixel from the reference frame.

20. The computer-readable non-transitory medium of claim 15, wherein the second confidence value corresponding to each of the sample pixels is inversely proportional to a temporal separation of the frame including the sample pixel from the reference frame.

* * * * *